Patented June 9, 1936

2,043,222

UNITED STATES PATENT OFFICE 2,043,222

METHOD OF MAKING CERAMIC OBJECTS

Otto Bartsch, Jena, Germany, assignor to the firm Jenaer Glaswerk Schott & Gen., Jena, Germany No Drawing. Application July 30, 1935, Serial No. 33,862. In Germany August 1, 1934

4 Claims. (Cl. 25—156)

Application has been filed in Germany, August 1, 1934.

When having been burnt ceramic bodies containing much silica generally reveal a substantial thermal expansion which is rather irregular on account of a changing progress in the different modifications of silica, the consequence being a great sensibility as regards changes of temperature. The said irregularity can be overcome more or less by adding to the batch feldspar or mica, which dissolve silica at high temperatures, but, nevertheless, these admixtures do not prove to be very useful in that they unfavourably influence the refractoriness under load, and this the more the greater the content of silica in the batch. This method is therefore not practical when ceramic bodies are to be made which contain much silica and are expanded by heat only insignificantly and which can be considered at the same time as fire-proof. Refractory bodies containing more than 90% silica and which are expanded by heat only very little cannot be made by means of the ceramic methods known so far.

It has been found out that bodies containing much silica suffer only very little expansion due to heat when they are quickly cooled down from temperatures ranging between 1,500° C. and 1,700° C. to approximately 1,000° C. This phenomenon is analogous to that known in connection with a rapid cooling-down of molten silica: The rapid cooling-down prevents the silica from crystallizing, and the product thus obtained is quartz glass. Experience has shown, however, that it is not necessary at all to fuse the silica and that by adding small quantities of a fusing means (for instance feldspar or mica) the same effect can be obtained in ceramic bodies at temperatures which are sufficient for fritting and, nevertheless, far below the melting point of silica and which differ according to the quantity of silica and the fusing means. In most cases, these temperatures range between 1,500° C. and 1,600° C. when the bodies contain more than 90% silica and less than 10% basic oxides. The higher the content of silica and the lower the content of fusing means, the higher will be the requisite minimum temperature for obtaining the desired reduction of expansion in a rapid cooling-down.

After a slow cooling-down, however, a reheating entails the well-known considerable expansion, which is due to the transformation to cristobalite or tridymite. In a body which contains, for instance, 95% silica, 4.2% alumina and 0.8% $Na_2O+K_2O+CaO+MgO$ and which is cooled down slowly after having been burnt at 1,500°, the linear and irregularly increasing expansion amounts to 1.2% in all when this body is reheated to 800° C. When cooled down quickly and reheated to 800°, this very body suffers a total and steadily increasing expansion of only 0.47%. Subsequently to a burning at 1,600° and to a quick cooling-down, the expansion is reduced to 0.12% at 800° C., which means that this expansion is only twice as great as that of quartz glass. Accordingly, such objects can be made by means of this method as have a coefficient of thermal expansion which is smaller than that of all ceramic objects known so far and lies between the coefficients of these objects and quartz glass.

When the objects are not to be made direct (for instance on account of size) the proceeding will have to be effected in a corresponding manner. Intermediate parts (stones or the like) of the body in question are made as described above; these parts are broken up; the desired objects are shaped by means of an agglutinant; and the objects are treated in the manner described hereinbefore.

I claim:

1. A method of making a body of ceramic material, consisting in this that a mixture containing much silica and a small content of fusing means is molded into the desired shape, then fritted at a temperature lying below its fusing point, and that, subsequently thereto, the body is cooled down rapidly.

2. A method of making a body of ceramic material, consisting in this that a mixture containing much silica and a small content of fusing means is molded into the desired shape, then fritted at a temperature of 1,500° C. to 1,700° C., and that, subsequently thereto, the body is cooled down rapidly to approximately 1,000° C.

3. A method of making a body of ceramic material, consisting in this that a mixture containing more than 90% silica and less than 1% basic oxides is molded into the desired shape, then fritted at a temperature lying below its fusing point, and that, subsequently thereto, the body is cooled down rapidly.

4. A method of making a body of ceramic material, consisting in this that a mixture containing much silica and a small content of fusing means is given any shape, then fritted at a temperature lying below its fusing point and cooled down rapidly, that subsequently thereto the mass is broken up into a plurality of relatively small portions, that these portions and an agglutinant are molded into the shape of the desired body and fritted at a temperature lying below their fusing point, and that the said body is finally cooled down rapidly.

OTTO BARTSCH.